United States Patent
Zimmermann et al.

(10) Patent No.: US 12,088,456 B2
(45) Date of Patent: Sep. 10, 2024

(54) PASSTHROUGH MODE CONTROL

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE Systems, Inc., Fremont, CA (US)

( * ) Notice: Subject to any disclaimer, the term of this patent is extended or adjusted under 35 U.S.C. 154(b) by 53 days.

(21) Appl. No.: 17/739,193

(22) Filed: May 9, 2022

(65) Prior Publication Data
US 2022/0358067 A1 Nov. 10, 2022

Related U.S. Application Data

(60) Provisional application No. 63/186,766, filed on May 10, 2021.

(51) Int. Cl.
| | | |
|---|---|---|
| *H04L 41/0663* | (2022.01) | |
| *G06F 13/38* | (2006.01) | |
| *G06F 13/40* | (2006.01) | |
| *G06F 13/42* | (2006.01) | |

(52) U.S. Cl.
CPC ........ *H04L 41/0663* (2013.01); *G06F 13/382* (2013.01); *G06F 13/385* (2013.01); *G06F 13/4004* (2013.01); *G06F 13/409* (2013.01); *G06F 13/4282* (2013.01); *G06F 2213/0042* (2013.01)

(58) Field of Classification Search
CPC . H04L 41/0663; G06F 13/382; G06F 13/385; G06F 13/4004; G06F 13/4282; G06F 13/0042
See application file for complete search history.

(56) References Cited

U.S. PATENT DOCUMENTS

| | | | | |
|---|---|---|---|---|
| 8,769,172 B2* | 7/2014 | Soffer | ................... | G06F 13/105 |
| | | | | 710/64 |
| 9,354,837 B2* | 5/2016 | Zimmerman | ......... | G06F 3/1288 |
| 11,157,289 B2* | 10/2021 | Regupathy | ............ | G06F 9/4418 |
| 2005/0240708 A1* | 10/2005 | Shaver | ................... | G06F 13/409 |
| | | | | 710/313 |
| 2010/0057975 A1* | 3/2010 | Ejiri | ...................... | G06F 3/0635 |
| | | | | 710/316 |
| 2010/0235655 A1* | 9/2010 | Tauscher | ................. | G06F 1/266 |
| | | | | 710/14 |
| 2011/0145451 A1* | 6/2011 | Soffer | ..................... | G06F 3/023 |
| | | | | 710/64 |

(Continued)

*Primary Examiner* — Henry Tsai
*Assistant Examiner* — Aurangzeb Hassan
(74) *Attorney, Agent, or Firm* — HORIZON IP PTE LTD.

(57) ABSTRACT

Framework for controlling passthrough mode is disclosed herein. Exemplary passthrough apparatus may include a relay, a first connection interface connectable to a first universal serial bus (USB) host device, a second connection interface connectable to a USB client device, and a third connection interface connectable to a second USB host device. The passthrough apparatus may further include a housing enclosing the relay and the first, second and third connection interfaces, wherein the relay communicatively couples the second connection interface and the third connection interface while communicatively decoupling the second connection interface and the first connection interface in response to disconnection of power to the relay during a passthrough mode.

17 Claims, 5 Drawing Sheets

(56) References Cited

U.S. PATENT DOCUMENTS

| | | | | |
|---|---|---|---|---|
| 2011/0161530 A1* | 6/2011 | Pietri | .................. | G06F 13/4022 |
| | | | | 710/14 |
| 2012/0242167 A1* | 9/2012 | Zeung | .................... | G06F 13/385 |
| | | | | 307/112 |
| 2013/0050084 A1* | 2/2013 | Soffer | ..................... | G06F 3/023 |
| | | | | 345/163 |
| 2014/0059257 A1* | 2/2014 | del Toro | ............... | G06F 3/1454 |
| | | | | 710/72 |
| 2015/0356045 A1* | 12/2015 | Soffer | ..................... | G06F 3/023 |
| | | | | 710/303 |
| 2016/0055009 A1* | 2/2016 | Sakamoto | ............. | G06F 1/3287 |
| | | | | 710/14 |
| 2016/0112507 A1* | 4/2016 | Serpico | ............... | H04L 67/1078 |
| | | | | 709/205 |
| 2017/0108910 A1* | 4/2017 | Goh | ....................... | G06F 13/385 |
| 2018/0048780 A1* | 2/2018 | Hikichi | .............. | H04N 1/00885 |
| 2018/0150121 A1* | 5/2018 | Basterash | ............ | G06F 1/3215 |
| 2019/0235890 A1* | 8/2019 | Schnoor | ............. | G06F 13/4068 |
| 2019/0278730 A1* | 9/2019 | Takezawa | ................ | G06F 13/14 |
| 2020/0065488 A1* | 2/2020 | Takezawa | ................. | G06F 3/00 |

* cited by examiner

PASSTHROUGH MODE CONTROL

CROSS-REFERENCE TO RELATED APPLICATION

This application claims the benefit of U.S. Provisional Application No. 63/186,766, filed May 10, 2021 entitled "Universal Serial Bus (USB) Port Management Framework," which is hereby incorporated by reference in its entirety.

BACKGROUND

In data centers, the concentration of Information Technology ("IT") devices (e.g., virtual devices instantiated in combination with physical computing hardware and software such as: compute nodes, networking nodes, storage nodes, power nodes, and/or cooling nodes) may create a data center environment with significant overhead in tracking, configuring, clustering and managing IT device state(s). The IT devices may also have a multitude of interfaces, which may require a multitude of different IT device concentrator hardware units to physically connect to the IT devices. In some other data center environments, collocation environment or edge of the network point-of-presence may deploy a flexible number of same kind of IT devices or a flexible number of different kinds of IT devices, which may create a challenge on planning the right multitude of different IT device concentrator hardware units to physically connect to the IT devices. Some of the various techniques to work in such a cluttered environment may require a combination of device search tools, multiple IT device concentrator hardware units, management tools and/or many more additional supporting tools.

Additionally, various IT devices, such as IT devices by various vendors, may have different communication interfaces, network protocols, functions, user interfaces and application programmable interfaces (APIs), which may increase the difficulty of communicating with IT device(s). Deploying multiple devices, setting up consistent configurations and adding network functions on new or existing infrastructures is very time consuming and tedious. Networking teams typically spend a long time during evaluation, especially when numerous appliances are required.

An infrastructure management system may be used to facilitate management and configuration of these IT devices. An infrastructure management system may automatically perform an action on an IT device based at least in part, by an IT device information. There are several standard interfaces an IT device may use to communicate with the infrastructure management system. One type of standard interface is the Universal Serial Bus (USB). The USB is an industry standard that establishes specifications for cables, connectors and protocols for connection, communication and power supply (interfacing) between computers, peripherals and other computers. A broad variety of USB hardware exists, including different connector types, such as types A, B and C connectors.

DETAILED DESCRIPTION

Some of the various embodiments of the present framework relate to infrastructure management systems, and more particularly to an infrastructure management system(s) configured to process network communication of data center, collocation environment or edge of the network point-of-presence component(s). Various embodiments relate to an infrastructure configured to process network communication from data center, collocation environment or edge of the network point-of-presence component(s) (e.g., IT devices) and employ the device information to determine an action to be performed on component(s) (e.g., IT devices) in an infrastructure management system.

A device is a machine and/or component that may attach to a computer and/or computer network. Examples of devices include disk drives, printers, displays, mice, and modems. These particular devices may fall into a category of peripheral devices separate from a main computing device. Other example devices may be non-peripheral devices such as IT devices. Many devices, whether peripheral or not, may employ a program called a device driver that may act as a translator, converting general commands from an application into specific commands that the device understands.

An IT device is an "Information Technology" device related to computing technology, comprising, but not limited to: data center devices, collocation environment devices, edge devices, networking devices, hardware devices, software operating in combination with a hardware IT device, Internet devices, and/or the like. Some IT devices may employ virtual devices operating on specially configured hardware. Additional examples of IT devices include servers, compute nodes, routers, switches, firewalls, load balancers, networking nodes, storage nodes, power nodes, cooling nodes, storage appliances, power appliances, cooling appliances, network appliances, virtual appliances, virtual machines, system hardware with network access, hosted module within a system, combinations thereof, and/or the like.

A virtual device may employ a software virtual device driver operating on a hardware computing device configured to emulate hardware and/or other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware and/or external software resources. Some examples of virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

An agent may comprise a computer program that acts for a user or other program in a relationship of agency, which derives from the Latin agere (to do): an agreement to act on one's behalf. Such "action on behalf of" implies the authority to decide which, if any, action is appropriate. Some agents may comprise, but are not limited to: intelligent agents (in particular exhibiting some aspect of artificial intelligence, such as learning and reasoning), autonomous agents (capable of modifying the way in which the agent achieves objectives), distributed agents (being executed on physically distinct computers), multi-agent systems (distributed agents that do not have the capabilities to achieve an objective alone and thus must communicate), mobile agents (agents that can relocate their execution onto different processors), and/or the like.

Some of the various embodiments may communicate with virtual (in combination with configured hardware) and/or physical IT devices such as compute nodes, networking nodes, storage nodes, power nodes, cooling nodes, other IT devices, combinations thereof, and/or the like. An infrastructure management system may automatically perform an action on IT device(s)—based at least in part, by an IT device information. The nature of the interaction between infrastructure management system(s) and IT device(s) may be regulated by the type of device itself to dictate network protocols natively supported by the IT device(s). The type of IT device(s) may also be used to identify a class or type of action that may apply for IT device(s) available in a network.

One aspect of the present framework provides a passthrough apparatus for controlling passthrough mode. The passthrough apparatus may include a relay, a first connection interface connectable to a first USB host device, a second connection interface connectable to a USB client device, and a third connection interface connectable to a second USB host device. The passthrough apparatus may further include a housing enclosing the relay and the first, second and third connection interfaces. The relay communicatively couples the second connection interface and the third connection interface while communicatively decoupling the first connection interface and the second connection interface in response to disconnection of power to the relay during a passthrough mode. The relay may further communicatively decouple the second connection interface and the third connection interface while communicatively coupling the second connection interface and the first connection interface in response to the relay receiving power.

The passthrough apparatus may be connected to an infrastructure management (IM) device that applies or disconnects power to the relay to enable normal or passthrough modes. By enabling normal mode or passthrough mode via the passthrough apparatus, a USB client device may be initially programmed by using one host device via the normal (or passthrough) mode and then routed to another host device via the passthrough (or normal) mode. These and other exemplary features and advantages will be provided in more details herein.

Figure 1:
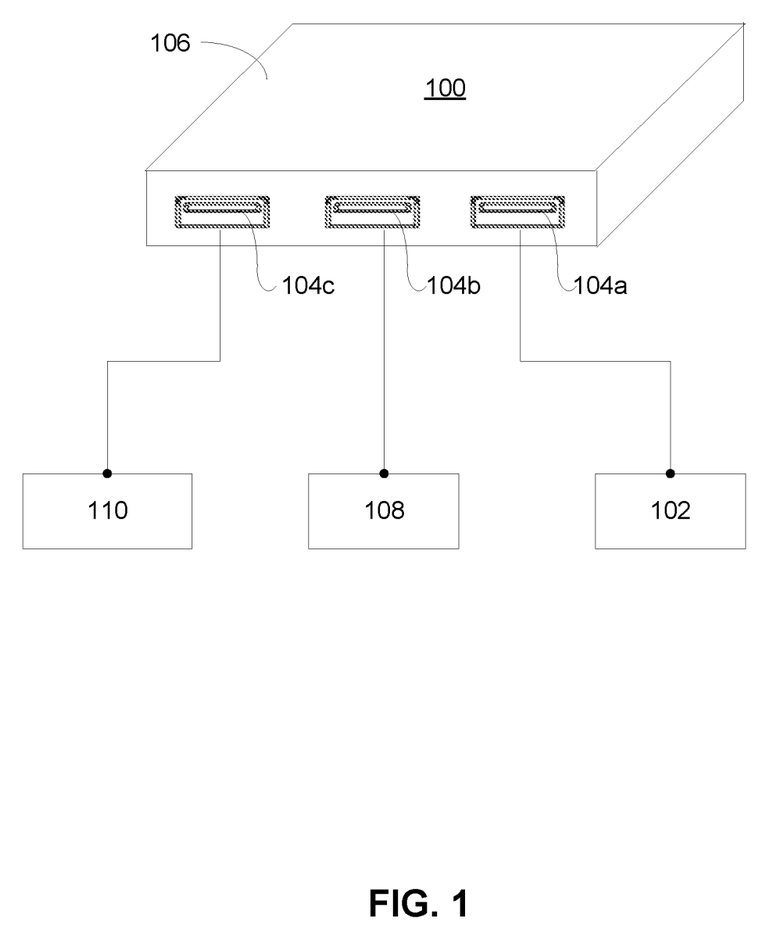
FIG. 1 shows an exemplary passthrough apparatus for passthrough mode control.

FIG. 1 shows an exemplary passthrough apparatus 100 for passthrough mode control. In some implementations, passthrough apparatus 100 includes a housing 106. Housing 106 may be configured to enclose a relay (not shown) and at least three connection interfaces 104a-c. First, second and third connection interfaces 104a-c may be located on one or more sides of the housing 106. Although FIG. 1 shows the 3 connection interfaces 104a-c located on a single side of the housing 106, other configurations or number of connection interfaces are also possible. For example, first, second and third connection interfaces 104a-c may be located on two or more different sides of the housing 106.

First, second and third connection interfaces (104a, 104b, 104c) may include USB ports for sending data to and from first USB host device 102, USB client device 108 and second USB host device 110 respectively. Alternatively, first and/or third connection interfaces (104a and 104c) may include a cable extending from the housing 106, with one end of the cable insertable into a USB port of the first USB host device 102 and/or second USB host device 110, while second connection interface 104b includes a USB port for receiving a USB connector of USB client device 108. Other configurations are also useful.

First connection interface 104a may be connectable to a first USB host device 102, while second and third connection interfaces 104b-c may be connectable to a USB client device 108 and a second USB host device 110 respectively. A "USB host device", as used herein, generally refers to a device that can serve as a "controller" device, to which other "USB client devices" can be attached.

First USB host device 102 may be, for instance, an infrastructure management (IM) device, such as a modular IM device that provides modular slots to receive communication card modules. The IM device may be employed in a data center, collocation environment or edge to process network communication of one or more components (e.g., IT devices). The IM device may configure, discover, cluster, index, exchange index table, search and/or take action on at least one component (e.g. IT device). The IM device may employ device information to determine an action to be performed on the one or more components. In some implementations, passthrough apparatus 100 is a dongle that plugs into a USB port of the IM device to serve as a passthrough control adapter.

USB client device 108 may be, for instance, a storage device including one or more non-transitory computer readable media for storing data (e.g., configuration or log files). Such storage device may be, for instance, a USB storage device, which includes, but is not limited to, a USB flash drive, a USB stick, a thumb drive, a pen drive, a jump drive, a disk on key, a flash-drive, a USB memory that includes flash memory with an integrated USB interface, or a combination thereof.

Second USB host device 110 may be a target device that is currently addressed for performing a data transfer, comprising, but not limited to: a data center device, collocation environment device, edge device, networking device, hardware device, software operating in combination with a hardware IT device, Internet device, a camera, a data recorder, a mobile device (e.g., smart phone, laptop), or a combination thereof, and/or the like. Some target devices may employ virtual devices operating on specially configured hardware. Additional examples of a second USB host device 110 include, but are not limited to, a server, compute node, router, switch, firewall, load balancer, networking node, storage node, power node, cooling node, storage appliance, power appliance, cooling appliance, network appliance, virtual appliance, virtual machine, system hardware with network access, hosted module within a system, a combination thereof, and/or the like.

Figure 2:
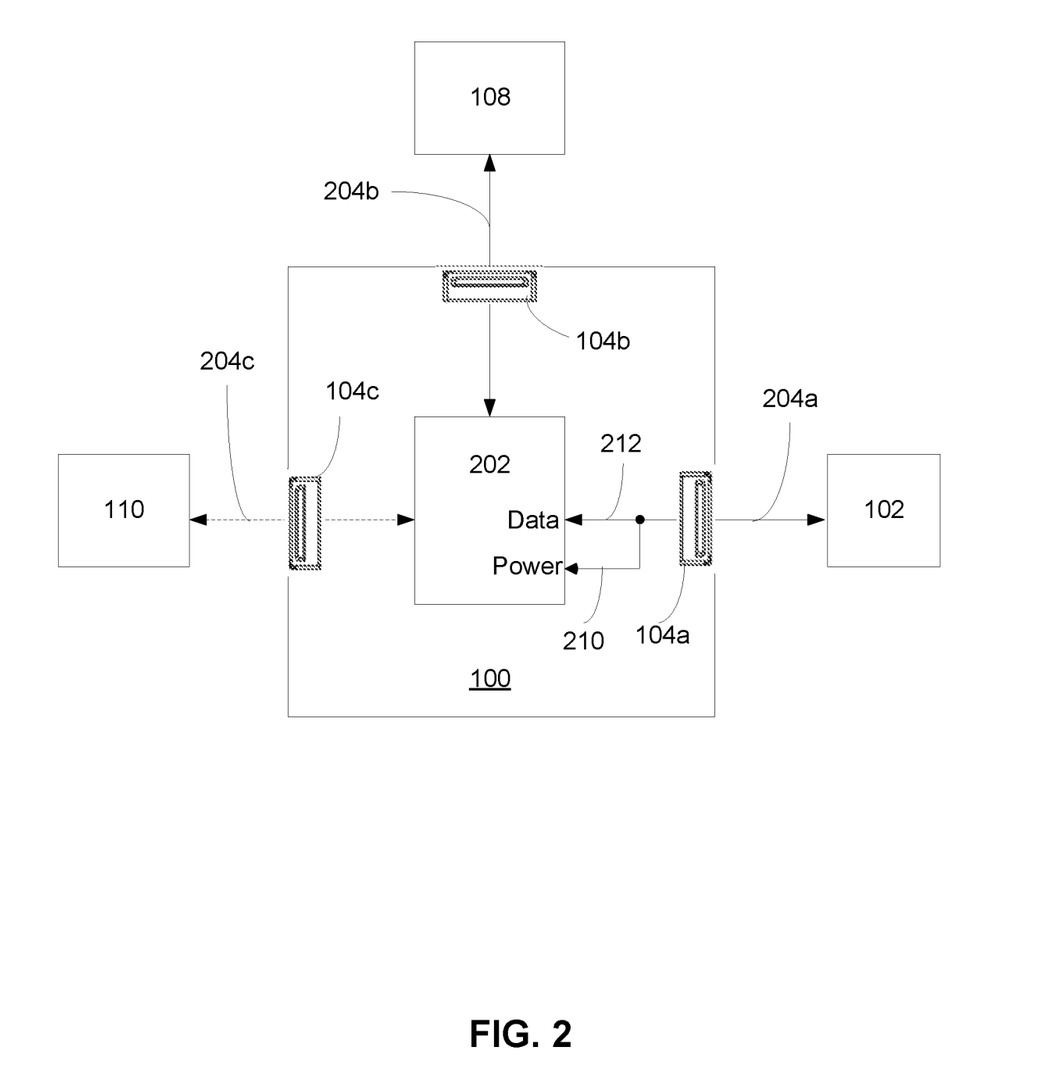
FIG. 2 shows an exemplary passthrough apparatus operating in normal mode.

FIG. 2 shows an exemplary passthrough apparatus 100 operating in normal mode. Passthrough apparatus 100 includes a relay 202, which is an electrical switch that is activated (or deactivated) by an electrical control signal. Relay 202 may include, for example, a solid-state relay that employs power semiconductor devices such as thyristors and transistors. Other types of relays are also useful.

Relay 202 is coupled to first USB host device 102, USB client device 108 and second USB host device 110 via connections 204a-c. In some implementations, connections 204a-c are USB cables connected to first USB host device 102, USB client device 108 and second USB host device 110, which are plugged into connection interfaces 104a-c.

The solid lines indicate that there is electrical communication in the connections 204a-b between the relay 202 and first USB host device 102 and USB client device 108. The broken line indicates that there is no electrical communication in connection 204c between relay 202 and second USB host device 110, even though there may be a physical connection (e.g., USB cable plugged into connection interface 104c).

During the normal ("ON") mode, first USB host device 102 provides power via connections 204a and 210 to the relay 202. In response to receiving the power, relay 202 communicatively couples USB client device 108 to first USB host device 102 and communicatively decouples USB client device 108 from second USB host device 110. In some implementations, first USB host device 102 (or a user at first USB host device 102) accesses USB client device 108 to, for example, format, copy, read and/or transfer data via connections 204a, 212 and 204b. For instance, first USB host device 102 may transfer a file (e.g., a bootable image for a second USB host device 110) to USB client device 108. This file may be previously stored on one or more non-transitory media in first USB host device 102, and/or transferred (e.g., over a network) to first USB host device 102 from a remote client device. As another example, first USB host device 102 may read a file (e.g., log file) stored on USB client device 108. The stored file may have been previously transferred to USB client device 108 from second USB host device 110 during a passthrough mode.

Figure 3:
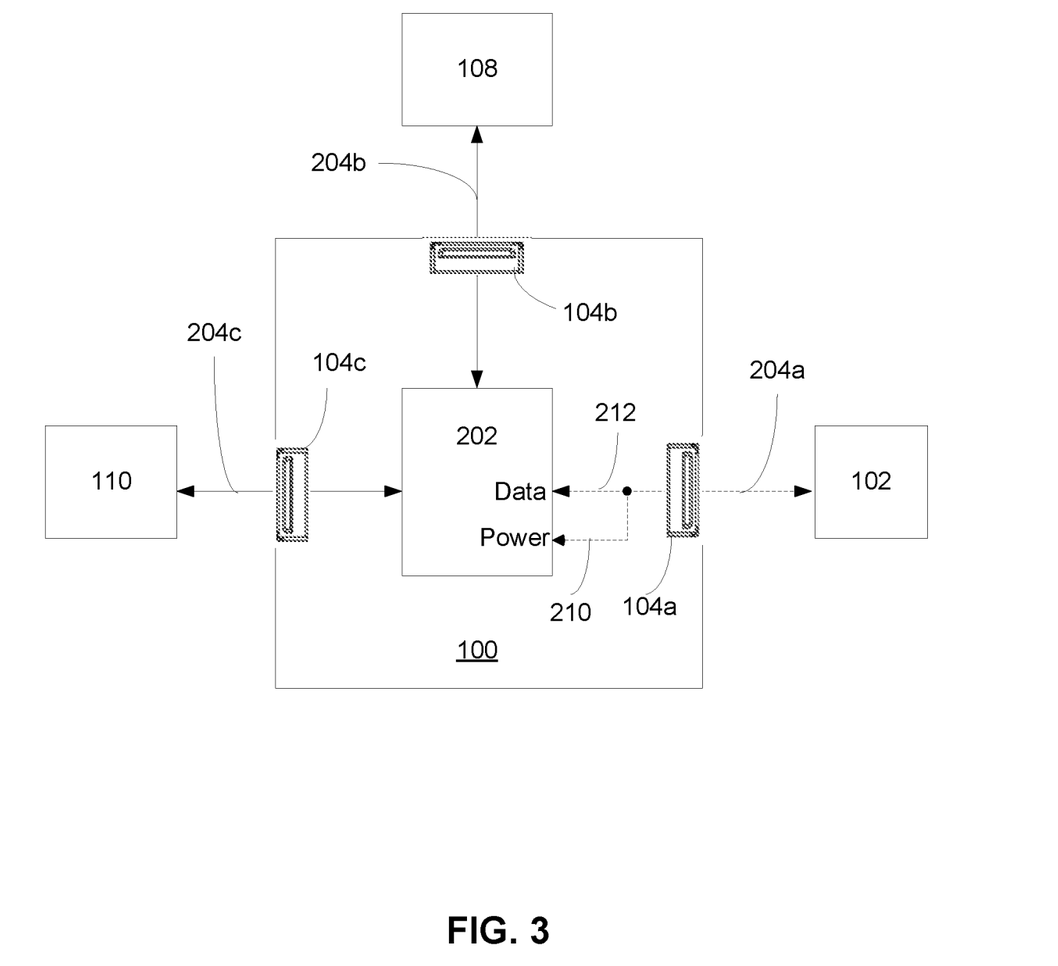
FIG. 3 shows an exemplary passthrough apparatus operating in passthrough mode.

FIG. 3 shows an exemplary passthrough apparatus 100 operating in passthrough mode. Relay 202 is coupled to first USB host device 102, second USB host device 110 and USB client device 108 via connections 204a-c. In some implementations, connections 204a-c are USB cables, which may be plugged into connection interfaces 104a-c. The solid lines indicate that there is electrical communication in the connections 204b-c between the relay 202 and the second USB host device 110 and USB client device 108. The broken line indicates that there is no electrical communication in connections 204a, 212 and 210 between relay 202 and first USB host device 102, even though there may be a physical connection (e.g., USB cable plugged into connection interface 104a).

During the passthrough ("OFF") mode, first USB host device 102 disconnects power supplied via connection interface 104a and connections 204a and 210 to the relay 202. In response to not receiving the power, relay 202 communicatively couples USB client device 108 to second USB host device 110 and communicatively decouples USB client device 108 from first USB host device 102. In some implementations, second USB host device 110 accesses USB client device 108 to, for example, format, copy, read and/or transfer data via connections 204b-c. For example, second USB host device 110 may be configured or booted using data stored on USB client device 108.

The normal and passthrough modes may be useful when a user is programming USB client device 108. For example, during normal mode, USB client device 108 may be initially programmed using data stored locally in first USB host device 102. Passthrough mode may then be enabled to route USB client device 108 to second USB host device 110. Second USB host device 110 may then be configured to, for example, boot directly from a firmware stored on USB client device 108. As another example, during passthrough mode, second USB host device 110 may transfer a file (e.g., log file) to USB client device 108. Normal mode may then be enabled to allow first USB host device 102 to access the file stored on USB client device 108.

Figure 4:
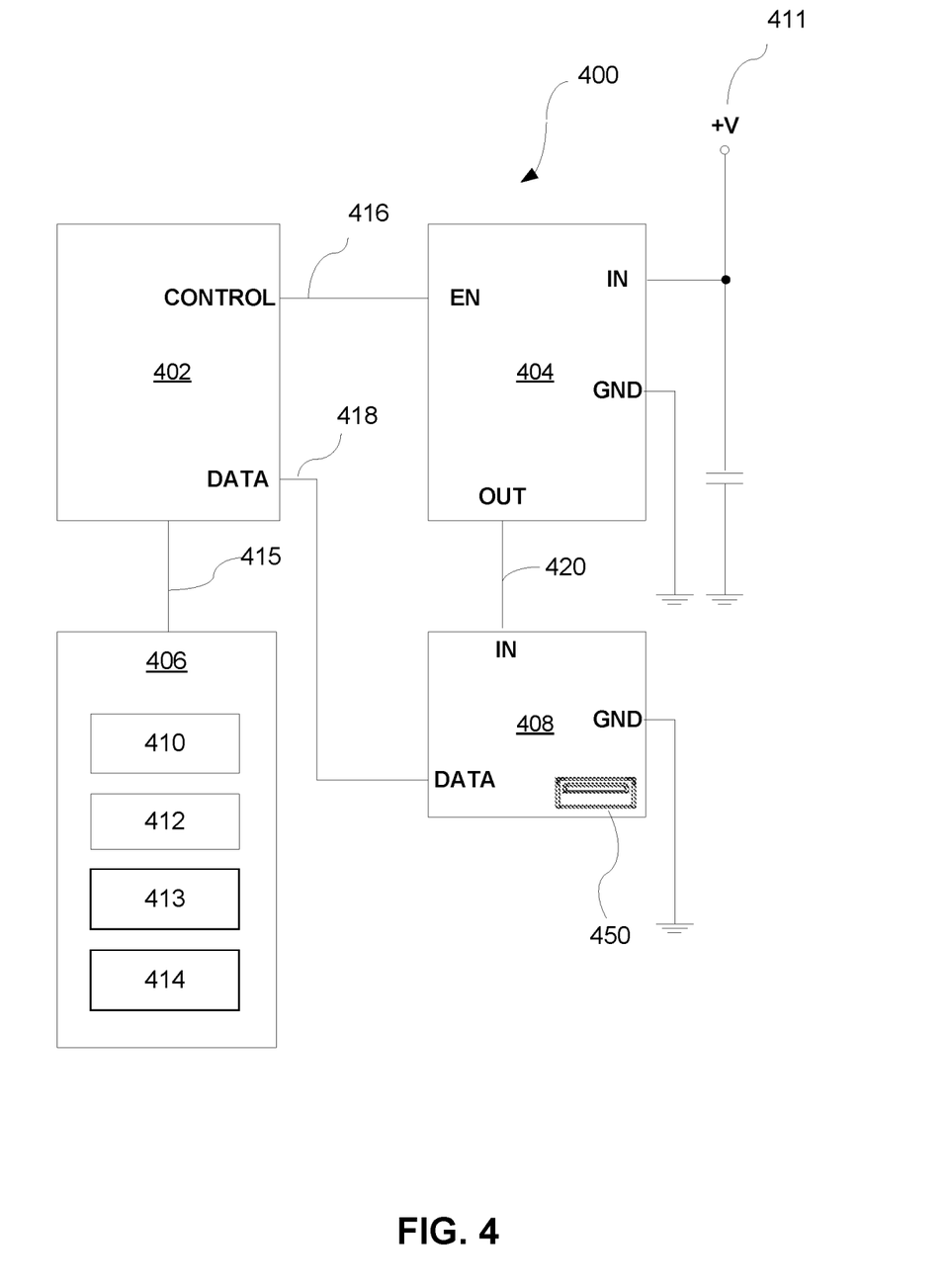
FIG. 4 shows an exemplary control system for controlling power supplied via universal serial bus (USB) port.

FIG. 4 shows an exemplary control system 400 for controlling power supplied via USB port 450. USB port 450 may be connected to first connection interface 104a on passthrough apparatus 100 via a USB cable. Exemplary control system 400 may be implemented on first USB host device 102 (e.g., IM device) to control power supplied to relay 202 via first connection interface 104a, as previously described. In some implementations, control system 400 includes a processor device 402 coupled to one or more non-transitory computer-readable media 406 (e.g., memory device), power control unit 404 and USB interface 408. Control system 400 may further include support circuits such as a cache, clock circuits and a communications bus. Various other peripheral devices, such as additional data storage devices and IT devices, may also be connected to the control system 400.

The present technology may be implemented in various forms of hardware, software, firmware, special purpose processors, or a combination thereof, either as part of the microinstruction code or as part of an application program, device driver or software product, or a combination thereof, which is executed via the operating system (OS). In some implementations, the techniques described herein are implemented as computer-readable program code tangibly embodied in one or more non-transitory computer-readable media 406. In particular, the present techniques may be implemented by a device driver 410, control application 412 and configuration engine 413. Device driver 410 and control application 412 may be implemented as part of the operating system (OS). Non-transitory computer-readable media 406 may further include a configuration dataset 414.

Device driver 410 enables an IT device (e.g., USB client device 108) to communicate with the OS via USB port 450. Control application 412 is a component of the OS that serves as a device manager to allow viewing and management of IT devices installed in control system 400. Configuration engine 413 may generate an interface to configure and/or manage control system 400. The interface may include a user interface made available via, for example, a command line interface (CLI), a web interface, programmatically via an application programmable interface (API), or a combination thereof. Configuration engine 413 may generate, store, read and/or update configuration data in configuration dataset 414. The configuration data may include power enablement information, which may comprise, for example, power enablement parameters and power states for individual USB ports.

Non-transitory computer-readable media 406 is communicatively coupled to processor device 402 via a data bus 415. Non-transitory computer-readable media 406 may include random access memory (RAM), read-only memory (ROM), magnetic floppy disk, flash memory, an in-memory data store, an on-disk data store, a local data store, a remote data store, a distributed data store, a replicated data store, other types of memories, or a combination thereof. The computer-readable program code is executed by processor device 402 to process data provided by, for example, configuration dataset 414. The computer-readable program code is not intended to be limited to any particular programming language and implementation thereof. It will be appreciated that a variety of programming languages and coding thereof may be used to implement the teachings of the disclosure contained herein.

USB interface 408 includes at least one USB port 450 for providing a connection between the control system 400 and an external device (e.g., passthrough apparatus 100). USB interface 408 receives data from the processor device 402 via data line 418. In some implementations, power supplied to the USB port 450 is controlled by power control unit 404, device driver 410 and control application 412.

Power control unit 404 is coupled to processor device 402 via a control line 416. Power control unit 404 is further coupled to the USB interface 408 via power line 420 to provide power to the USB port 450. Although only one power control unit 404 and one USB interface 408 are shown, it should be appreciated that multiple power control units may be provided to supply power to multiple USB interfaces. One power control unit 404 may be coupled to one corresponding USB interface 408. Multiple power control units 404 may be coupled to the processor device 402 via multiple control lines 416. Each control line 416 may control one or more power control units 404.

The initial state of power for the USB port 450 may be defined by the power control unit 404 until control application 412 determines the new power state based on power enablement information. Control system 400 may define the initial state of the USB port 450 as disabled, so no power is applied to the USB port 450 and to any device coupled to the USB port 450 until the control application 412 determines the power state based on the power enablement information. Control application 412 may cause the processor device 402 to enable the power control unit 404 via control line 416. Upon enablement by processor device 402, power control unit 404 supplies power from the power source 411 to the USB interface 408 via power line 420, which then supplies power to the USB port 450. When control application 412 causes the processor device 402 to disable the power control unit 404 via control line 416, power control unit 404 disconnects the power supplied by power source 411 via power line 420, thereby disconnecting power to USB port 450.

Figure 5:
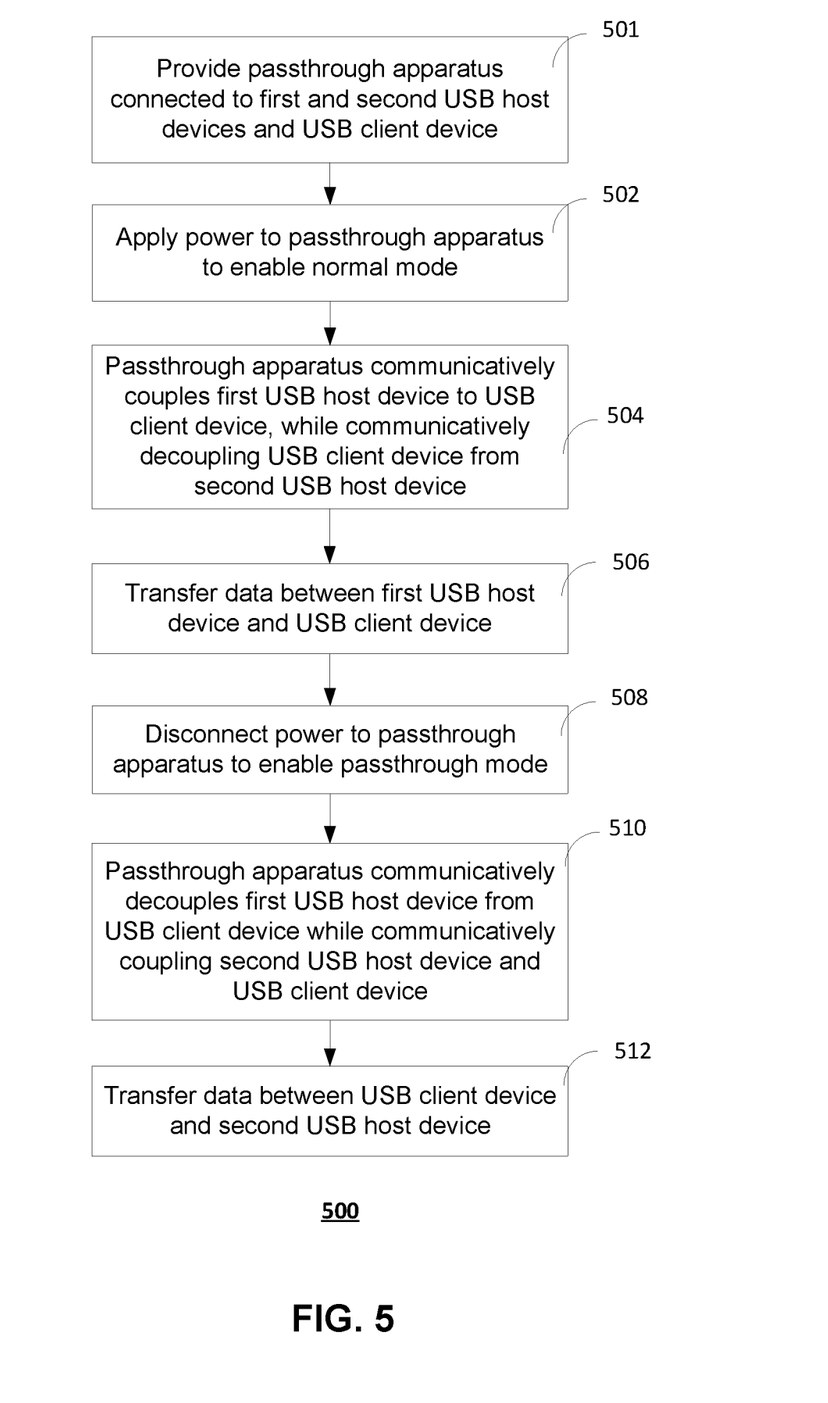
FIG. 5 shows an exemplary method of controlling passthrough mode.

FIG. 5 shows an exemplary method 500 of controlling passthrough mode. It should be understood that the steps of the method 500 may be performed in the order shown or a different order. Additional, different, or fewer steps may also be provided. Further, the method 500 may be implemented with the passthrough apparatus 100 of FIGS. 1-3, control system 400 of FIG. 4, a different system, or a combination thereof.

At 501, a passthrough apparatus 100 is provided. Passthrough apparatus 100 is connected to first USB host device 102 via connection interface 104a and connection 204a. Passthrough apparatus 100 may further be connected to USB client device 108 via connection interface 104b and connection 204b, and second USB host device 110 via connection interface 104c and connection 204c. First USB host device 102 may be an IM device, while USB client device 108 may be a storage device and second USB host device 110 may be a target device.

At 502, power is applied to passthrough apparatus 100 to enable the normal mode. In some implementations, the power is applied by a first USB host device 102 coupled to passthrough apparatus 100 via connection interface 104a. First USB host device 102 may apply the power using the control system 400. For example, control application 412 may cause the processor device 402 to enable the power control unit 404 via control line 416. Upon enablement by processor device 402, power control unit 404 supplies power from the power source 411 to the USB interface 408 via power line 420, which then applies power via USB port 450 connected to first connection interface 104a on passthrough apparatus 100.

At 504, in response to the application of power, passthrough apparatus 100 communicatively couples first USB host device 102 and USB client device 108, while communicatively decoupling the USB client device 108 from second USB host device 110.

At 506, data is transferred between first USB host device 102 and USB client device 108. For instance, first USB host device 102 may transfer a file (e.g., a bootable image for a second USB host device 110) to USB client device 108. This file may be previously stored on one or more non-transitory media in first USB host device 102, and/or transferred (e.g., over a network) to first USB host device 102 from a remote USB client device. First USB host device 102 may also read a file stored on USB client device 108.

At 508, power is removed or disconnected from the passthrough apparatus 100 to enable passthrough mode. In some implementations, the power is disconnected by first USB host device 102. First USB host device 102 may disconnect the power using the control system 400. For example, control application 412 may cause the processor device 402 to disable the power control unit 404 via control line 416. Power control unit 404 then disconnects the power supplied by power source 411 via power line 420, thereby disconnecting power via USB port 450 connected to first connection interface 104a on passthrough apparatus 100.

At 510, passthrough apparatus 100 communicatively decouples first USB host device 102 from USB client device 108, while communicatively coupling second USB host device 110 and USB client device 108.

At 512, data is transferred between USB client device and second USB host device. For example, second USB host device 110 may be configured or booted using data stored on USB client device 108. As another example, second USB host device 110 may transfer a file to USB client device 108 for storage.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments. In particular, it should be noted that, for example purposes, the presently described embodiments are discussed with respect to a data center, collocation environment or edge. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

What is claimed is:

1. A passthrough apparatus, comprising:
a relay;
a first connection interface connectable to a first universal serial bus (USB) host device;
a second connection interface connectable to a USB client device;
a third connection interface connectable to a second USB host device; and
a housing enclosing the relay and the first, second and third connection interfaces, wherein the relay communicatively couples the second connection interface and the third connection interface while communicatively decoupling the first connection interface and the second connection interface in response to disconnection of power from the first USB host device to the relay during a passthrough mode, wherein the relay communicatively decouples the second connection interface and the third connection interface while communicatively coupling the second connection interface and the first connection interface in response to the relay receiving power from the first USB host device during a normal mode.

2. The passthrough apparatus of claim 1 wherein the first, second and third connection interfaces comprise universal serial bus (USB) ports.

3. The passthrough apparatus of claim 1 wherein the first connection interface is connected to an infrastructure management device.

4. The passthrough apparatus of claim 3 wherein the infrastructure management device disconnects the power to the relay to enable the passthrough mode.

5. The passthrough apparatus of claim 3 wherein the infrastructure management device applies the power to the relay to enable the normal mode.

6. The passthrough apparatus of claim 3 wherein the infrastructure management device comprises a control system that controls power supplied to the relay via the first connection interface.

7. The passthrough apparatus of claim 1 wherein the second connection interface is connected to a storage device.

8. The passthrough apparatus of claim 7 wherein the storage device comprises a USB flash drive, a USB stick, a thumb drive, a pen drive, a jump drive, a disk on key, a flash-drive, a USB memory that includes flash memory with an integrated USB interface, or a combination thereof.

9. The passthrough apparatus of claim 1 wherein the third connection interface is connected to a target device.

10. The passthrough apparatus of claim 9 wherein the target device comprises an information technology (IT) device, a collocation environment device, an edge device, a networking device, a hardware device, software operating in combination with an IT device, an Internet device, a camera, a data recorder, a mobile device, or a combination thereof.

11. A passthrough mode control method, comprising:
providing a passthrough apparatus connected to a first USB host device, a USB client device and a second USB host device;
disconnecting, by the first USB host device, power from the first USB host device to the passthrough apparatus to enable a passthrough mode;
in response to the disconnecting the power, communicatively decoupling, by the passthrough apparatus, the first USB host device and the USB client device while communicatively coupling the second USB host device and the USB client device;
transferring first data between the USB client device and the second USB host device;
applying, by the first USB host device, power from the first USB host device to the passthrough apparatus to enable a normal mode;
communicatively coupling, by the passthrough apparatus, the first USB host device and the USB client device while communicatively decoupling the second USB host device and the USB client device; and
transferring second data between the USB client device and the first USB host device.

12. The passthrough mode control method of claim 11 wherein transferring the first data between the USB client device and the second USB host device comprises transferring the first data stored on the USB client device to the second USB host device.

13. The passthrough mode control method of claim 11, wherein the passthrough apparatus is connected to the first USB host device, the USB client device and the second USB host device via one or more USB ports.

14. The passthrough mode control method of claim 11 wherein providing the passthrough apparatus comprises providing the passthrough apparatus connected to an infrastructure management device, a storage device and a target device.

15. The passthrough mode control method of claim 11 wherein transferring the first data between the USB client device and the second USB host device comprises configuring or booting the second USB host device using the first data stored on the USB client device.

16. The passthrough mode control method of claim 11 wherein transferring the second data between the USB client device and the first USB host device comprises transferring the second data stored on the USB client device to the first USB host device.

17. A control system, comprising:
a passthrough apparatus including first, second and third connection interfaces;
a universal serial bus (USB) port connected to the first connection interface;
one or more non-transitory computer-readable media for storing computer-readable program code; and
at least one processor in communication with the one or more non-transitory computer-readable media, wherein the at least one processor is operative with the computer-readable program code to perform operations including
disconnecting power from a first USB host device to the USB port to enable a passthrough mode of the passthrough apparatus, wherein the passthrough apparatus communicatively decouples the first and second connection interfaces while communicatively coupling the second and third connection interfaces in response to disconnection of the power, and
applying power to the USB port to enable a normal mode of the passthrough apparatus, wherein the passthrough apparatus communicatively couples the first and second connection interfaces while communicatively decoupling the second and third connection interfaces in response to application of the power from the first USB host device.

* * * * *